United States Patent
Weston

(10) Patent No.: US 9,944,331 B2
(45) Date of Patent: Apr. 17, 2018

(54) PERFORATED DEFORMATION REGION FOR A VEHICLE HOOD

(71) Applicant: Ford Global Technologies, LLC, Dearborn, MI (US)

(72) Inventor: Keith Weston, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 11 days.

(21) Appl. No.: 15/177,443

(22) Filed: Jun. 9, 2016

(65) Prior Publication Data

US 2017/0355400 A1    Dec. 14, 2017

(51) Int. Cl.
*B62D 25/12* (2006.01)
*B60R 13/00* (2006.01)

(52) U.S. Cl.
CPC ............ *B62D 25/12* (2013.01); *B60R 13/005* (2013.01)

(58) Field of Classification Search
CPC ............................. B62D 25/12; B60R 13/005
USPC .................................................... 296/187.04
See application file for complete search history.

(56) References Cited

U.S. PATENT DOCUMENTS

| 7,631,928 | B2 * | 12/2009 | Ackland | B62D 25/105 |
| | | | | 296/193.11 |
| 7,690,722 | B2 * | 4/2010 | Boggess | B60R 21/34 |
| | | | | 296/187.04 |
| 8,118,352 | B2 | 2/2012 | Rocheblave et al. | |
| 2015/0054305 | A1 | 2/2015 | Steinhilb | |
| 2015/0353049 | A1 | 12/2015 | Nishida | |

FOREIGN PATENT DOCUMENTS

| DE | 10247425 A1 | 4/2004 |
| FR | 2951420 A1 | 4/2011 |

OTHER PUBLICATIONS

Ford Hood Insulation 1987-1993, http://www.cjponyparts.com/ford-hood-insulation-1987-1993/p/HDI2/, Feb. 25, 2016, 2 pp.

\* cited by examiner

*Primary Examiner* — Joseph D. Pape
*Assistant Examiner* — Dana D Ivey
(74) *Attorney, Agent, or Firm* — Jason Rogers; Brooks Kushman P.C.

(57) ABSTRACT

A hood for a vehicle includes an inner panel having a deformation region on at least a portion of the inner panel. The deformation region defining a plurality of perforations configured to tear at an area between the perforations. The perforations being defined in an array constituting at least a partial outer periphery of the deformation region such that upon impact, the deformation region is configured to break along the outer periphery at the area between the perforations.

13 Claims, 3 Drawing Sheets

PERFORATED DEFORMATION REGION FOR A VEHICLE HOOD

TECHNICAL FIELD

The present disclosure relates to a deformation region on a vehicle hood.

BACKGROUND

Vehicles typically cover an engine compartment using a hood. The hood includes an outer panel and an inner panel. The inner panel gives the hood structure and rigidity. During an impact, the inner panel creates a hard point that absorbs energy due to the collision

SUMMARY

A hood for a vehicle includes an inner panel having a deformation region on at least a portion of the inner panel. The deformation region defining a plurality of perforations configured to tear at an area between the perforations. The perforations being defined in an array constituting at least a partial outer periphery of the deformation region such that upon impact, the deformation region is configured to break along the outer periphery at the area between the perforations.

A vehicle includes a hood having an inner panel and a plurality of perforations. The plurality of perforations, having equal perforation area, is defined on the inner panel. The perforations are disposed in an array and each of the perforations is spaced an equal distance apart to define a region that deforms upon impact along an outer periphery of the region such that the region tears away from the inner panel.

An inner panel for a vehicle hood includes a region configured to deform. The region is encompassed by a plurality of equally-spaced, equally-sized perforations defined in an array that comprises an outer perimeter of the region. Upon impact, the array is configured to tear along the outer perimeter to control deformation of the region such that energy from the impact is absorbed by the perforations at the region.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
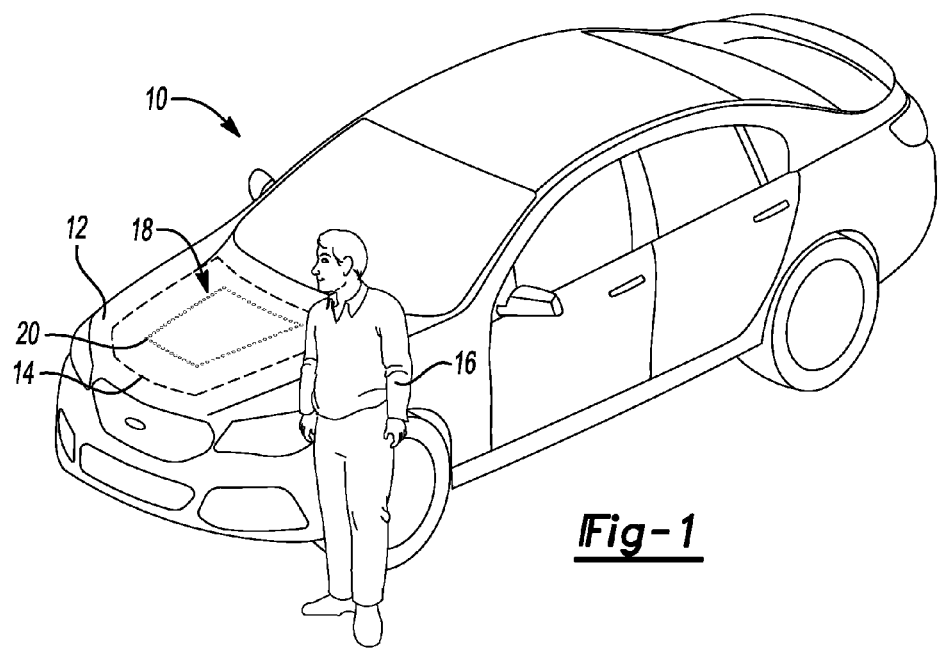
FIG. 1 is a perspective view of a vehicle having a hood with an inner panel defining a deformable region.

Referring to FIG. 1, a perspective view of a vehicle 10 having a hood 12 with an inner panel 14 is depicted. The vehicle 10 is shown impacting a pedestrian 16. During an impact with the pedestrian 16, the inner panel 14 may be configured to crumple and absorb energy away from the pedestrian 16. To absorb energy away from the pedestrian 16, the inner panel 14 may include a deformable region 18. The deformable region 18 may be configured to deform in a controlled manner. For example, upon impact with the pedestrian 16, energy from the impact may be transferred to the inner panel 14 and directed to the deformable region 18 in a way that allows the deformable region 18 to absorb energy from the pedestrian 16. In other words, the deformable region 18 may deform in an expected manner.

Traditionally, the inner panel 14 may be configured to absorb energy from an impact with the pedestrian 16 through utilizing large slots within the inner panel 14. The large slots reduce the hard points associated with the inner panel 14. Further, the large slots may be disposed across the entirety of the inner panel 14 to allow the inner panel 14 to crumple and absorb energy from an impact. However, the slots on the inner panel 14 degrade the appearance of the inner panel 14 and are unsightly when the hood 12 is in an open position. Therefore, it may be advantageous to use a deformable region 18 on the inner panel 14 that reduces creating large open spaces or cutouts on the inner panel 14.

As will be described in more detail below, the inner panel 14 may use a plurality of perforations 20 to define the deformable region 18. In at least one embodiment, the plurality of perforations 20 may be a plurality of small holes defined on the inner panel 14 that are configured to tear during an impact. The plurality of perforations 20 may further direct the deformation of the inner panel 14 at the deformable region 18 to control energy absorption by the inner panel 14. The plurality of perforations 20 is configured to absorb energy from the impact through fracturing. Further, the plurality of perforations 20 further aid to control deformation of the inner panel 14 by defining the deformable region 18. The plurality of perforations 20 may also define a size such that the disadvantages, such as the unsightly appearance of the large slots, are negated.

Figure 2:
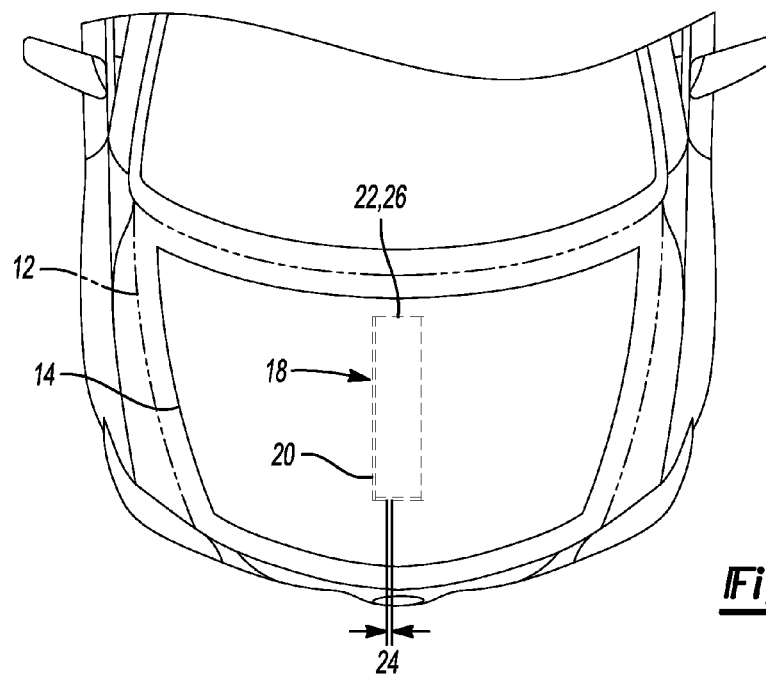
FIG. 2 is a partial perspective view of an inner panel for a vehicle hood having a deformable region defined by a plurality of perforations.

FIG. 2 depicts a partial perspective view of the inner panel 14 using the plurality of perforations 20 to define the deformable region 18. As can be seen with reference to FIG. 2, the plurality of perforations 20 define an outer periphery 22 of the deformable region 18. The plurality of perforations 20 encompasses the deformable region 18 to direct energy absorption from an impact at the deformable region 18. The plurality of perforations 20 may act as a tear seam around the outer periphery 22 of the deformable region 18. For example, during impact, energy may be transferred to the plurality of perforations 20 at the deformable region 18 causing an area 24 between each of the individual perforations 20 to fracture. Fracturing the area 24, between each of the individual perforations 20, directs the impact energy at the deformable region 18.

Directing the impact energy to the deformable region 18 provides control of deformation of the inner panel 14. Again, controlling deformation of the inner panel 14 allows the hood 12 to reduce hard contact points from the rigid inner panel 14. The perforations 20 may be defined in an array 26 that constitutes the outer periphery 22 of the deformable region 18. As by example, FIG. 2 depicts the array 26 as substantially rectangular. In at least one other embodiment, the array 26 may also be defined in a substantially circular, elliptical, or other shape that allows the plurality of perforations 20 to tear along an outer periphery 22 of the deformable region 18. The number of perforations 20 may vary based on the array 26. Specifically, the number of perforations 20 may be optimized depending on the area 24 between each individual perforation 20, the size of the deformable region 18, as well as the shape of the array 26 that allows for best absorption of impact energy.

Figure 3:
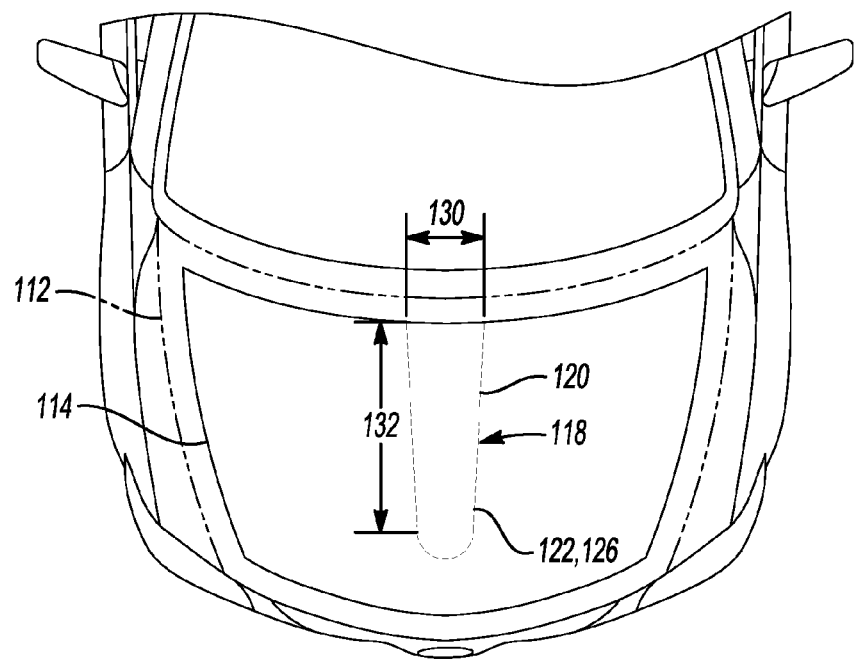
FIG. 3 is a partial perspective view a further embodiment of an inner panel for a vehicle hoof having a deformable region at least partially defined by a plurality of perforations.

FIG. 3 depicts another embodiment of the inner panel 114 having a deformable region 118 having an outer periphery 122 partially defined by a plurality of perforations 120. As can be seen in FIG. 3, the plurality of perforations 120 defines the outer periphery 122 of the deformable region 118 in a substantially oblong shape. Defining the plurality of perforations 120 such that the outer periphery 122 of the deformable region 118 is substantially oblong further allows for further control of deformation within the region 118. For example, upon fracturing of the perforations 120, the deformable region 118 may crumple such that the deformable region 118 extends in a direction substantially normal, or perpendicular to a surface 128 of the inner panel 114. In at least one other embodiment, the plurality of perforations 120 may partially define the outer periphery 122 of the deformable region 118 in a substantially circular, rectangular, or any other shape that allows for further control of deformation within the region 118.

Control of the deformation of the region 118 may be based on the partiality of the outer periphery 122 defined by the plurality of perforations 120. For example, as shown in FIG. 3, the perforations 120 are not defined continuously around an entirety of the outer periphery 122. A gap 130 may be defined between two substantially parallel lines 132 of perforations 120. The gap 130 directs where the deformable region 118 crumples. The perforations 120 cause the deformable region 118 to fracture from the inner panel 114 to detach the deformable region 118 from the inner panel 114. In the embodiment disclosed in FIG. 3, the gap 130 maintains attachment between the deformable region 118 and the inner panel 114. Therefore, the gap 130 directs how the deformable region 118 crumples relative to the inner panel 114 and the location of the gap 130 determines where the deformable region 118 crumples relative to the inner panel 114. The size and location of the gap 130 may be optimized based on a preferred crumpling of the deformable region 118 relative to the inner panel 114.

Further, more than one gap 130 may be used in conjunction with the perforations 120 to further direct and control deformation of the region 118 relative to the inner panel 114. For example, the perforations 120 may only extend into directions such that an array 126 of perforations 120 may form a substantial L-shape. Likewise, the array 126 of perforations 120 may form a substantial H-shape. The array 126 of perforations 120 may also be defined as two substantially parallel lines 132. The array 126 of perforations 120 may also be optimized based on preferred deformation of the region 118 relative to the inner panel 114. The array 126 of perforations 120 along with the one or more gaps 130 may define the entire outer periphery 122 of the deformable region 118. Defining an array 126 of perforations 120 further aids to control how energy is absorbed by the inner panel 114 during an impact.

Figure 4:
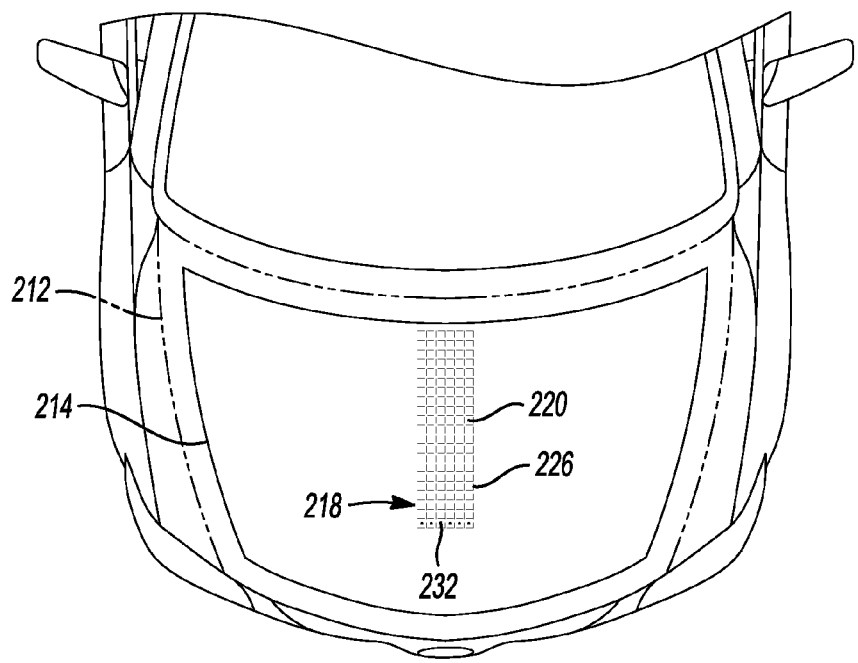
FIG. 4 is a partial perspective view of a further embodiment of an inner panel for a vehicle hood having a deformable region composed of a plurality of perforations.

FIG. 4 depicts a further embodiment of the inner panel 214 having a deformable region 218, in which the array 226 of perforations 220 fills an entirety of the deformable region 218. The array 226 may be defined in random order in which the perforations 220 are randomly defined within the deformable region 218 of the inner panel 214, or the array 226 may be defined having an organized order, as shown in FIG. 4. For example, the array 226 may be defined such that the perforations 220 are equidistant from a central axis 232 of each individual perforation 220. Filling the entire deformable region 218 with the array 226 allows the inner panel 214 to absorb energy from an impact at the deformable region 218.

Further, the array 226 may also use a random size and shape of perforations 220, or be defined having a constant size and shape of perforations 220. For example, if the array 226 is randomly defined, the perforations 220 may also have random sizes and shapes. Each of the perforations 220 may be different sizes and shapes throughout the array 226 and may be defined at different distances from the central axis 232 of each other perforation 220. Likewise, if the array 226 is not randomly defined, the perforations 220 may be of equal size and shape. Each of the perforations 220 may define the same size, same shape, and be defined equidistant from the central axis 232 of each other perforation 220.

If the array 226 is randomly defined within the deformable region 218 than the plurality of perforations 220 may also be randomly defined. For example, the plurality of perforations 220 may include substantially square perforations 220, substantially circular perforations 220, substantially elliptical perforations 220, or any other shape that allows the plurality of perforations 2202 to tear within the deformable region 218 to absorb energy, as described above. Further, spacing between the perforations 220 may also be randomly defined. For example, the perforations 220 defining an area greater than other perforations 220 defined within the deformable region 218 may be spaced further from perforations 220 having a lesser area. Defining a plurality of perforations 220 with non-uniformity allows for greater optimization of the deformable region 218 to absorb energy. For example, depending on the type of impact, certain shapes of perforations 220 may be used within a certain area of the deformable region 218 while other shapes of perforations 220 may be used in a different area of the deformable region 218 in order to absorb the most energy.

If the array 226 is specifically defined within the deformable region 218, then the plurality of perforations 220 may also be specifically defined. For example the plurality of perforations 220 may all define the same size and shape. Further, as stated above, the plurality of perforations 220 may also be equidistant from a central axis 232 of each of the perforations 220. The plurality of perforations 220 may define any shape configured to tear upon loading based on impact characteristics and absorb energy as described above. In at least one embodiment, the plurality of perforations 220 may define a substantially circular shape and are configured to tear to absorb energy. In at least one other embodiment, the plurality of perforations 220 may define a substantially rectangular shape and are configured to tear to absorb energy during an impact having different impact characteristics. Therefore, the plurality of perforations 220 may define an optimal shape within the deformable region 218 which allows the inner panel 214 to absorb energy from various loading characteristics.

Figure 5:
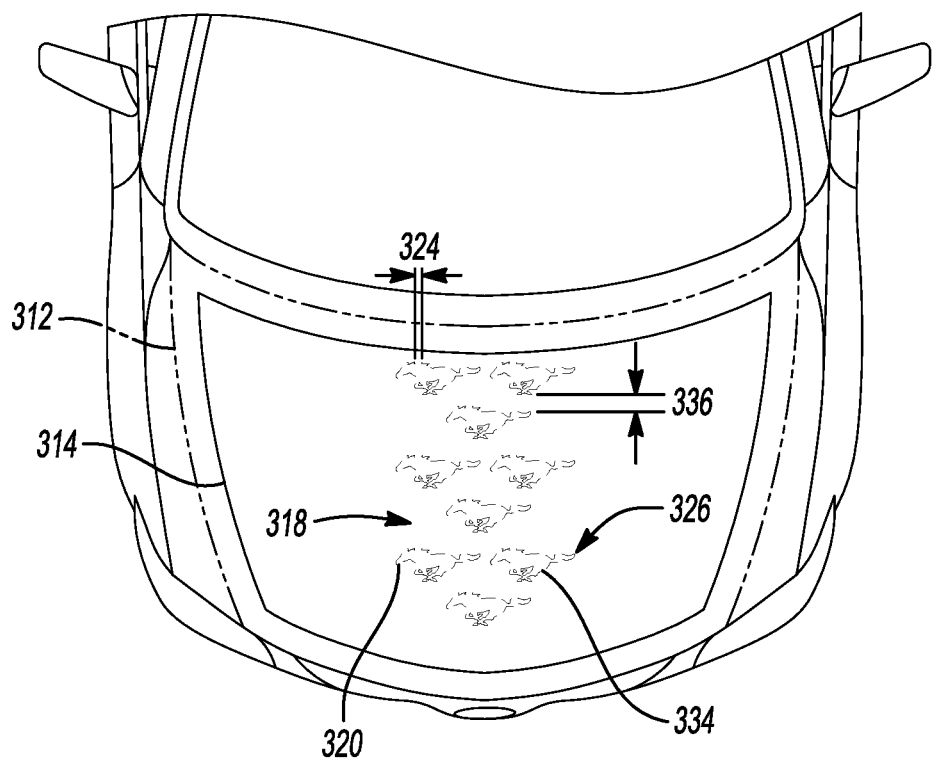
FIG. 5 is a partial perspective view of a further embodiment of an inner panel for a vehicle hood having a deformable region composed of a plurality of perforations defining a symbol.

FIG. 5 depicts another embodiment of the inner panel 314 of the hood 312 having a deformable region 318 using the plurality of perforations 320. In this embodiment, the deformable region 318 may be defined in a way such that the array 326 of perforations 320 is organized to produce a symbol 334. As can be seen in FIG. 5, the array 326 of perforations 320 may be arranged such that multiple symbols 334 are defined within the deformable region 318 of the inner panel 314. In at least one other embodiment, the array 326 of perforations 320 may be arranged such that a single symbol 334 defines the deformable region 318 of the inner panel 314.

The array 326 of perforations 320 that define one or more symbols 334 is configured to allow the deformable region 318 at the inner panel 314 to absorb energy as described above. In this embodiment, the perforations 320 may define sufficient size and shape in order to depict the symbol 334, as well as to tear with in the deformable region 318 to absorb impact energy as described above. Further, the area 324 between the perforations 320 may also be compared with the size of the perforations 320 to form the symbol 334. For example, the array 326 of perforations 320 may be optimized based on geometry of the one or more symbols 334 such that sufficient energy is absorbed through tearing of the area 324 between the perforations 320. Likewise, the number of symbols 334 may be determined such that the array 326 of perforations 320 fractures at and within the deformable region 318 of the inner panel 314.

The spacing between the symbols 334 may further define the deformable region 318. As described above, the deformable region 318 absorbs energy from an impact when the plurality of perforations 320 fracture and tear at the area 324 defined by the array 326. In a similar manner, the type, size and shape of the symbols 334 may be such that area 336 between the symbols 334 provides optimal spacing between the perforations 320 based on differing impact characteristics. For example, the array 326 of symbols 334 may provide a uniform area 336 between each of the other symbols 334. Likewise, the array 326 of symbols 334 may provide differing area 336 between each of the other symbols 334. The area 336 between the symbols 334 further aids to control deformation of the inner panel 314 at the deformable region 318.

Similarly, in the embodiment where the array 326 defines a single symbol 334, the array 326 may provide sufficient spacing such that the area 324 between each of the other perforations 320 is configured to fracture and tear to absorb energy. For example, the array 326 of perforations 320 that defines the symbol 334 may define the area 324 between the perforations 320 based on loading characteristics of differing impacts. This allows the inner panel 314 to absorb energy at the deformable region 318 to provide further control of impact energy absorption. Therefore, the plurality of perforations 320 further aid the inner panel 314 to further absorb impact energy while maintaining the structural rigidity and stiffness to support the hood.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A hood for a vehicle comprising:
an inner panel of the hood having a deformation region on at least a portion of the inner panel, the deformation region defining a plurality of perforations that tears at an area between the perforations, the perforations being defined in an array to form a symbol that constitutes at least a partial outer periphery of the deformation region such that upon impact, the deformation region breaks along the outer periphery at the area between the perforations.

2. The hood of claim 1, wherein the perforations are defined in the array such that the perforations form a plurality of symbols.

3. The hood of claim 2, wherein each of the plurality of symbols is the same from each of the other symbols of the plurality of symbols.

4. The hood of claim 1, wherein the perforations are defined within and throughout the deformation region.

5. The hood of claim 1, wherein the perforations comprise an entirety of the outer periphery of the deformation region.

6. A vehicle comprising:
a hood having an inner panel; and
a plurality of perforations, having equal perforation area, defined on the inner panel, the perforations being disposed in an array that forms a symbol along a partial outer periphery of a region, and being spaced an equal distance apart to define the region that deforms upon impact along the partial outer periphery of the region such that the region tears away from the inner panel.

7. The vehicle of claim 6, wherein the perforations are also defined on the hood.

8. The vehicle of claim 6, wherein the plurality is configured to tear at an area disposed between each of the perforations.

9. The vehicle of claim 6, wherein the array is non-uniform.

10. A vehicle hood inner panel comprising:
a region defined on the inner panel for a hood that deforms, the region being encompassed by a plurality of equally-spaced, equally-sized perforations defined in an array that forms a symbol and comprises an outer perimeter of the region and, upon impact, that tears along the outer perimeter to control deformation of the region such that energy from the impact is absorbed by the perforations at the region.

11. The inner panel of claim 10, wherein the perforations define a circular shape.

12. The inner panel of claim 10, wherein the array defines an elliptical shape.

13. The inner panel of claim 10, wherein the array defines a rectangular shape.

* * * * *